United States Patent
Emmert et al.

[19]

[11] Patent Number: 5,807,012
[45] Date of Patent: Sep. 15, 1998

[54] COUPLING APPARATUS

[75] Inventors: Steven Clark Emmert, Crystal Lake; Louis J. Lundell, Buffalo Grove, both of Ill.

[73] Assignee: Motorola, Inc., Schaumburg, Ill.

[21] Appl. No.: 751,390

[22] Filed: Nov. 18, 1996

Related U.S. Application Data

[63] Continuation of Ser. No. 509,484, Jul. 31, 1995, abandoned.

[51] Int. Cl.⁶ ..................................................... F16C 11/00
[52] U.S. Cl. .......................... 403/103; 403/289; 403/326; 403/354; 403/408.1; 411/508; 248/126
[58] Field of Search ..................................... 403/101, 103, 403/91, 289, 290, 326, 329, 354, 405.1, 406.1, 407.1; 248/126, 316.1, 346.04, 346.06; 411/508, 509, 512, 913; 24/297

[56] References Cited

U.S. PATENT DOCUMENTS

| | | | |
|---|---|---|---|
| 3,611,510 | 10/1971 | Bennett et al. | 403/354 |
| 3,991,446 | 11/1976 | Mooney et al. | 411/508 X |
| 4,568,801 | 2/1986 | Gates et al. . | |
| 4,786,225 | 11/1988 | Poe et al. | 24/297 X |
| 4,951,550 | 8/1990 | Ohki et al. | 403/326 X |
| 4,952,106 | 8/1990 | Kubogochi et al. | 411/508 X |
| 5,087,004 | 2/1992 | Lundell et al. . | |
| 5,143,500 | 9/1992 | Schuring et al. | 403/289 X |

*Primary Examiner*—Daniel P. Stodola
*Assistant Examiner*—Bruce A. Lev
*Attorney, Agent, or Firm*—John J. King

[57] ABSTRACT

A unique coupling apparatus of the present invention comprises a substantially hollow cylinder functioning as a coupling member (106) preferably having gaps (126, 141) extending in the axial direction from the ends, leaving attachment members in the center. One end of the cylinder contains an undercut feature in the shape of an annular ring or flange (128) on the interior surface of the cylinder. The opposite end of the cylinder contains an undercut feature in the shape of an annular ring or flange (142) on the exterior surface of the cylinder. The gaps in the center of the cylinder allow the half portions of the cylinder to flex about the attachment members toward or away from one another at each end respectively. The novel coupling apparatus finds particular application in retaining a pivoting wall mount/desk mount conversion bracket (100) in either of two positions of a base (200) such as a cordless telephone base station.

11 Claims, 6 Drawing Sheets

COUPLING APPARATUS

This is a continuation of application Ser. No. 08/509,484, filed Jul. 31, 1995 and now abandoned.

FIELD OF THE INVENTION

The present invention is generally related to a coupling apparatus, and more particularly to a coupling apparatus adapted to attach a bracket.

BACKGROUND OF THE INVENTION

In devices having housings which are adapted to contain communication circuitry, such as wireless communication devices, cellular telephones, cordless telephones and base stations therefor, it is often necessary to couple housings or portions of housings to one another, or to couple discrete elements to a housing. Such a need to couple elements requires a coupling apparatus having a reliable, inexpensive design to allow for both easy manufacture and assembly.

When coupling plastic housings, it is necessary that the coupling elements be designed to allow for consistent manufacture from a given tool. That is, the coupling apparatus must be of a sufficient strength and consistency to function properly to couple the elements. It is also necessary that the design be durable to allow for the coupling apparatus to withstand use for a desired period of time.

While a coupling apparatus may enable coupling of a housing in one configuration, a housing or other element may also be attached in separate configurations, or be moveable between the two configurations. Prior art devices generally require a separate coupling apparatus for coupling the elements in the different configurations or positions. Also, prior art devices for coupling are often susceptable to breakage. For example, prior art devices having exposed tabs can often wear or fail.

Accordingly, there is a need for a coupling apparatus being easily adapted to couple elements in two positions or configurations. There is a further need for a durable, reliable coupling apparatus which is easily manufactured and assembled to couple elements of a device.

DESCRIPTION OF THE PREFERRED EMBODIMENTS

The coupling apparatus of the present invention preferably comprises a substantially hollow cylinder having gaps extending in the axial direction from first and second ends, leaving attachment members in the center. One end of the cylinder contains an undercut feature in the shape of an annular ring or flange on the exterior surface of the cylinder. The opposite end of the cylinder contains an undercut feature in the shape of an annular ring or flange on the interior surface of the cylinder. The gaps in the center of the cylinder allow the half portions of the cylinder to flex about the attachment members toward or away from one another at each end respectively.

The novel coupling apparatus finds particular application in retaining a pivoting wall mount/desk mount conversion bracket in either of two positions. The coupling apparatus retains the bracket in the desk mount position via deflection of the half portions of the cylinder having the flange on the exterior of the cylinder toward one another. This deflection is a result of pressing the cylinder into a mating cylinder recess which contains mating flanges. Once the cylinder is pressed fully into the cylinder recess, the two half portions of the cylinder return to their original positions, thus locking the bracket in place.

When the bracket is pivoted into the wall mount position, the coupling retains the bracket in this position via the deflection of the half portions having interior flanges away from one another. This deflection is a result of pressing the hollow cylinder onto a mating cylindrical post which contains mating flanges. Once the cylinder is pressed fully onto the cylindrical post, the two halves of the cylinder returns to their original positions, thus locking the bracket in place.

Figure 1:
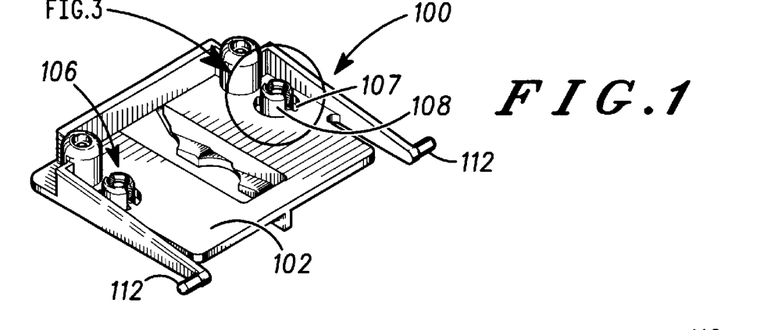
FIG. 1 is a perspective view of a bottom surface of a bracket 100 having a coupling member according to the present invention.
Figure 2:
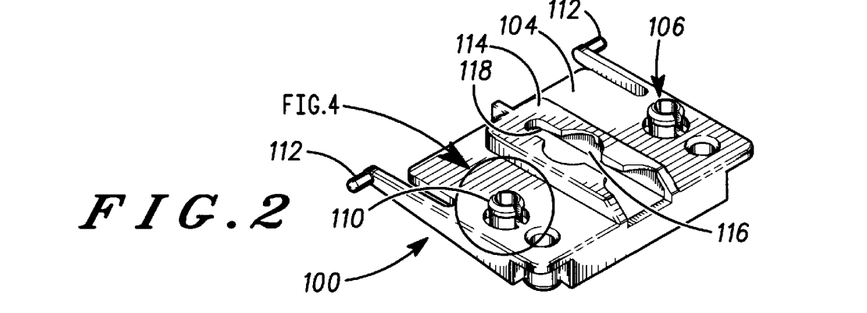
FIG. 2 is a perspective view of a top surface of the bracket of FIG. 1.

Turning now to FIGS. 1 and 2, a bracket 100 has a bottom surface 102 and a top surface 104. Coupling members 106 are attached to bracket 100 and have a bottom portion 108 extending from bottom surface 102 and a top portion 110 extending from top surface 104. Bracket 100 further includes pivot pins 112 which will allow the bracket to be movably attached to a base, as will be described in more detail in reference to FIGS. 11–13. As shown in FIG. 2, a first wall mounting member 114 located on top surface 104 comprises a circular aperture 116 and a longitudinal guide 118 for receiving mounting hardware such as a stud. The operation of the wall mounting member will be described in more detail in reference to FIG. 13.

Figure 3:
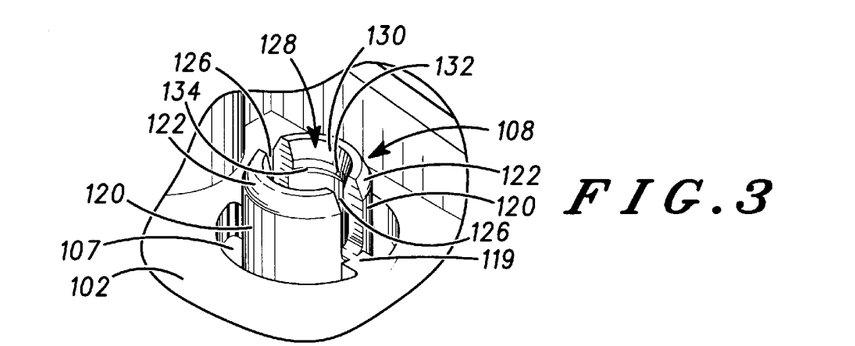
FIG. 3 is an isolated view of a bottom portion of the coupling member shown in FIG. 1.
Figure 13:
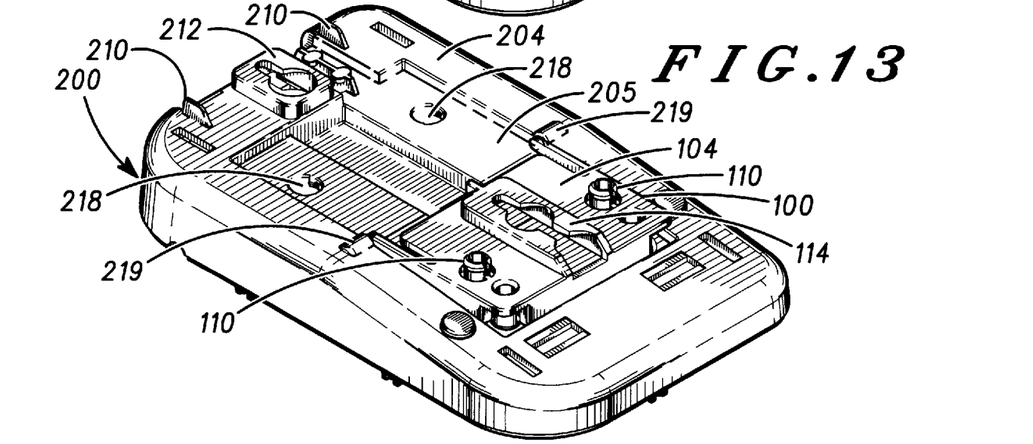
FIG. 13 is a perspective view of the base and bracket in a second locked position.

Turning now to FIG. 3, an isolated view shows bottom portion 108 of coupling member 106 extending through aperture 107, and connected to bracket 100 by one or more attachment members 119. A second attachment member is preferably located directly opposite the attachment member visible in FIG. 3. Alternatively, a single attachment member could extend through the hollow cylinder. Bottom portion 108 further comprises a shaft portion 120 leading to a beveled edge 122. Bottom portion 108 is divided into half portions by gaps 126. Although two gaps are shown, additional gaps could be employed within the spirit and scope of the present invention. While coupling member 106 is secured by attachment member 119 to bracket 100, gaps 126 enable the half portions of bottom portion 108 to move with respect to one another to enable securing bracket in a first position as shown in FIG. 13. Depending upon the location of the gaps and the size and location of the attachment members, the attachment members can function as torsion bars. A flange 128 positioned within bottom portion 108 preferably comprises a first beveled edge 130, a contact surface 132 and a second beveled edge 134. This flange is formed by a die-pass of steel in a tool which also defines the remainder of the interior surfaces of the hollow cylinder. The operation of bottom portion 108 will be described in more detail in reference to FIG. 17

Figure 4:
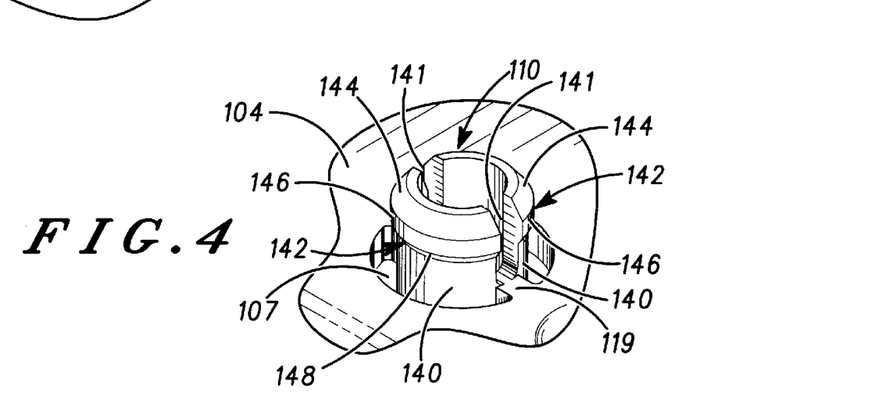
FIG. 4 is an isolated view of a top portion of the coupling member shown in FIG. 2.

Turning now to FIG. 4, an isolated view of top portion 110 of coupling member 106 is shown. In particular, top portion 110 extends through aperture 107 from top surface 104 and is also attached to bracket 100 by attachment members 119. Bracket 100, bottom portion 108, top portion 110, and attachment members 119 preferably form a single piece, but could be discrete components. Top portion 110 is also divided into half portions by gaps 141. A flange 142 is positioned at the distal end of a shaft portion 140 on the outer surface of the shaft. Flange 142 preferably comprises a first beveled edge 144, a contact surface 146 and a second beveled edge 148. This flange is formed by a die-pass of steel in a tool which also defines the remainder of the exterior surfaces of the hollow cylinder. The operation of top portion 110 of coupling member 106 will be described in more detail in reference to FIG. 15.

Figure 5:
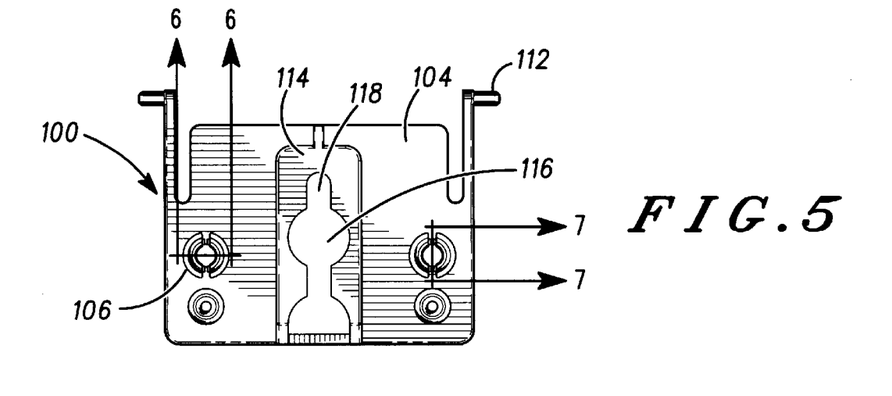
FIG. 5 is a plan view of the top surface of the bracket shown in FIG. 2.
Figure 6:
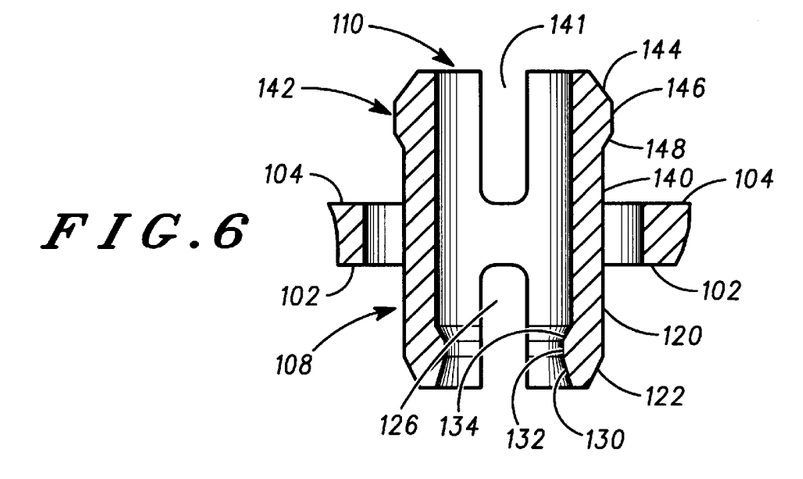
FIG. 6 is a cross-sectional view of the coupling member of the bracket taken at lines 6—6 of FIG. 5.
Figure 7:
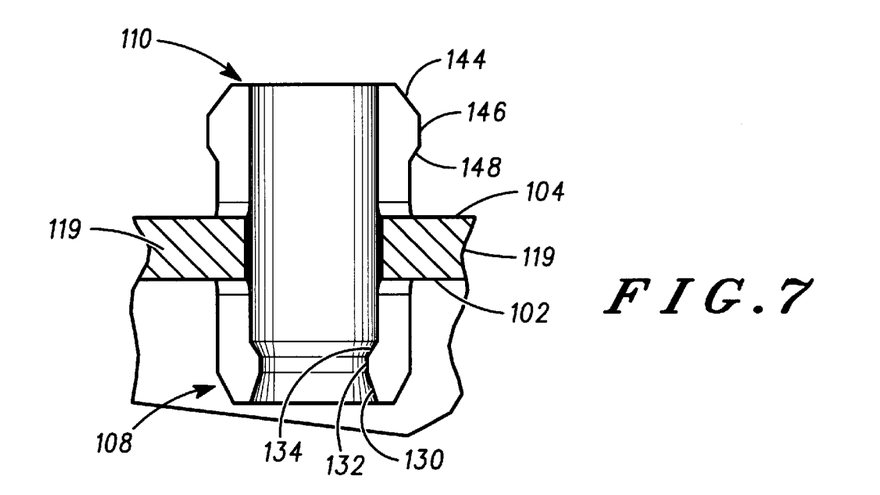
FIG. 7 is a cross-sectional view of the coupling member of the bracket taken at lines 7—7 of FIG. 5.

Turning now to FIGS. 5–7, cross-sectional views of the coupling member 106 taken at lines 6—6 of FIG. 6 and lines 7—7 of FIG. 7 more clearly show the attachment of coupling member 106 to bracket 100 to enable its operation. In particular, as shown in FIG. 6, the half portions of top portion 110 which are separated by gaps 141, are coupled by attachment members 119 to enable the half portions to move with respect to one another. Similarly, the half portions of bottom portion 108, which are separated by gap 126, are also connected by attachment member 119 to enable the bottom portions to move with respect to one another.

Figure 8:
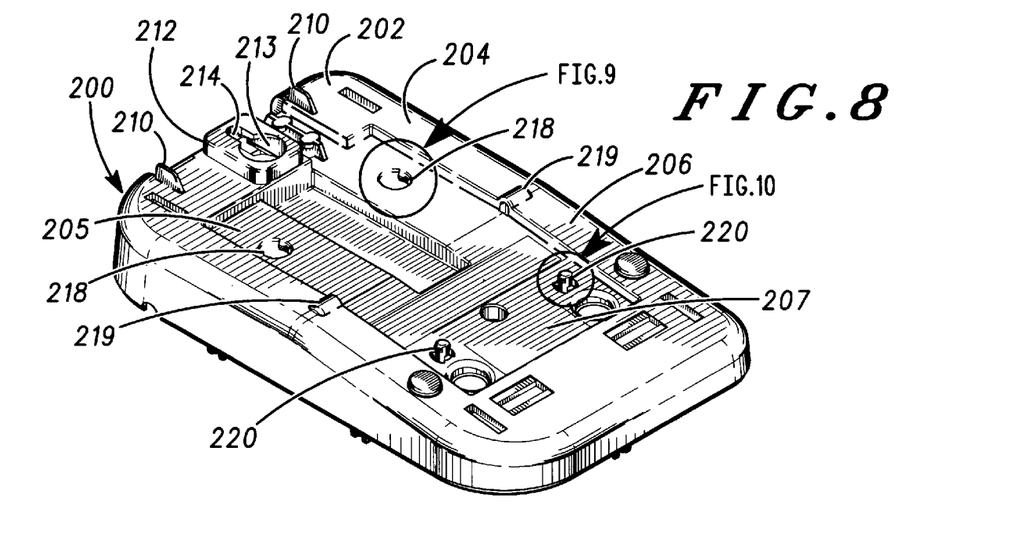
FIG. 8 is a perspective view of a base for receiving the bracket according to the present invention.

Turning now to FIG. 8, a base 200 for receiving bracket 100 is shown. The base could be, for example, a base station for a cordless telephone or other communication or electronic device which can be mounted on a wall or positioned on a table. Bracket 100 is movably attached to base 200 to allow for different configurations of the base when on the wall or on a table. Base 200 comprises a rear surface 202 having a first plane 204 incorporating a first recessed area 205, and a second plane 206 incorporating a second recessed area 207. Feet 210 are positioned on rear surface 202, along with a second wall mounting member 212 having a circular aperture 213 and a longitudinal guide 214. Locking apertures 218, each of which are adapted to receive the top portion of a coupling member 106 as shown in FIG. 4, are positioned in the first recessed area 205. Although two locking apertures are shown, any number of locking apertures could be employed. A preferred locking aperture 218 is shown in more detail in FIG. 9.

Base 200 further includes pivot pin receptacles 219 located at the fulcrum between first plane 204 and second plane 206. Pivot pin receptacles 219 are adapted to receive pivot pins 112 of bracket 100. Finally, locking pins 220, each of which are adapted to receive a bottom portion 108 of a coupling member 106 as shown in FIG. 3, are located in second recessed area 207. A preferred locking pin 220 is shown in more detail in the isolated view shown in FIG. 10.

Figure 9:
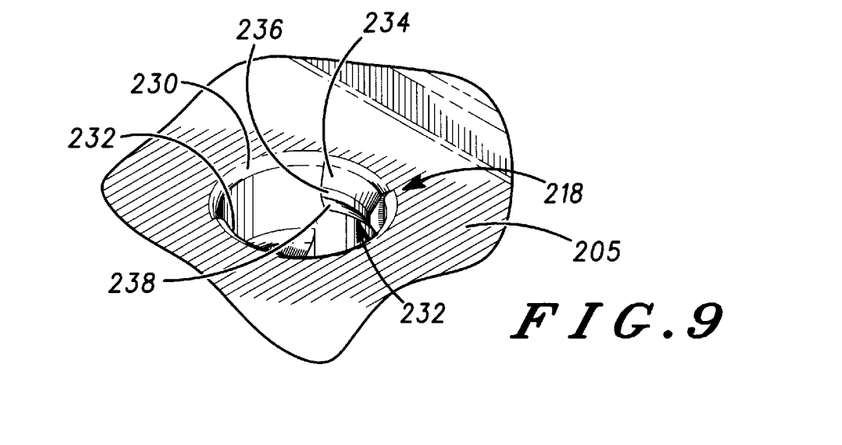
FIG. 9 is an isolated view of a locking aperture shown in FIG. 8.

Turning now to FIG. 9, locking aperture 218 preferably comprises a circular hole having a beveled edge 230 extending around the hole. Beveled edge 230 helps guide top portion 110 into locking aperture 218. Two flanges 232 are positioned opposite each other and extending downward from recessed area 205. Each flange 232 preferably comprises a first beveled edge 234, a contact surface 236, and a second beveled edge 238. Locking flanges 232 are adapted to operatively mate with top portion 110 of bracket 100. The mating of flanges 232 and top portion 110 will be described in more detail in reference to FIG. 15. Although only two flanges are shown, any number of flanges could be included in the aperture.

Figure 10:
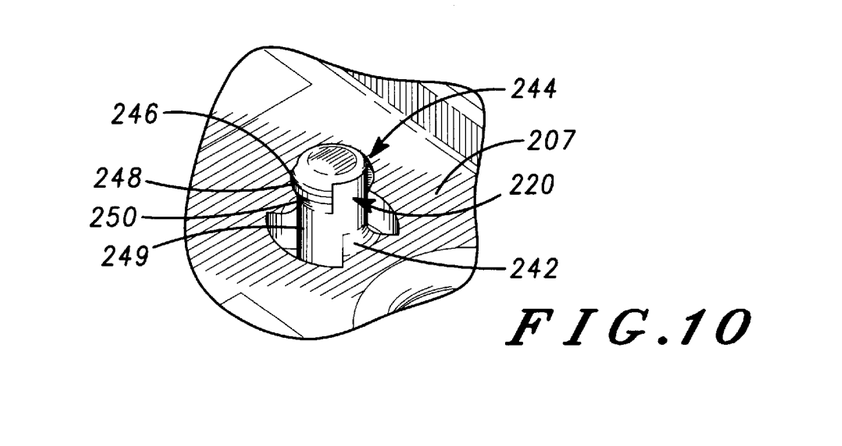
FIG. 10 is an isolated view of a locking pin shown in FIG. 8.

Turning now to FIG. 10, locking pin 220 extends upward from second recessed area 207 and is coupled to recessed areas 207 of base by means of coupling arms 242. Locking pin 220 comprises a flange 244 having a first beveled edge 246, a contact surface 248 and a second beveled edge 250 positioned at the distal end of a shaft 249. Flange 244 is adapted to mate with bottom portion of 108 of bracket 100. The mating of these elements will be described in more detail in reference to FIG. 17.

Figure 11:
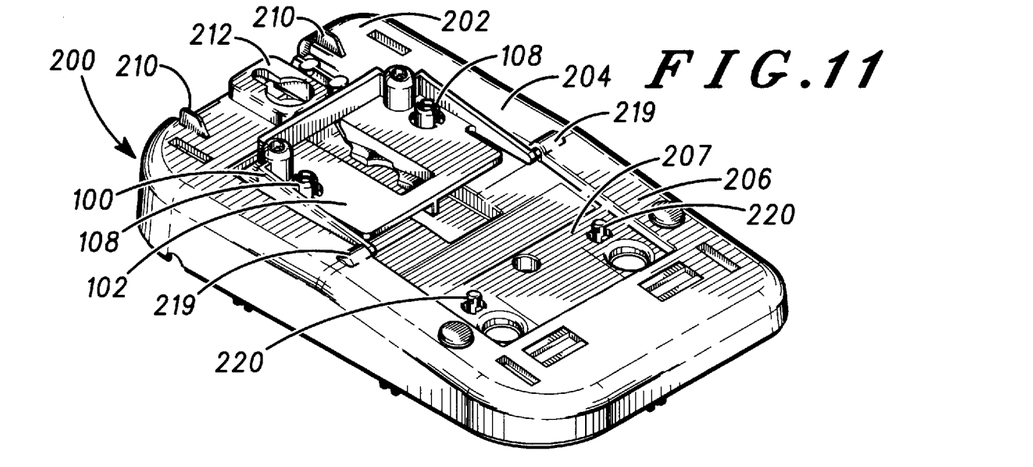
FIG. 11 is a perspective view of the base and bracket in a first locked position.
Figure 12:
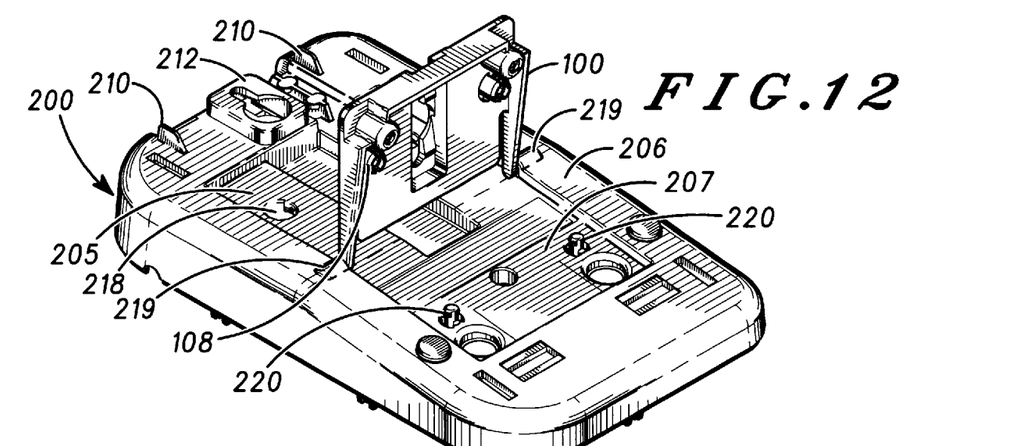
FIG. 12 is a perspective view of the base and bracket in an unlocked position.
Figure 14:
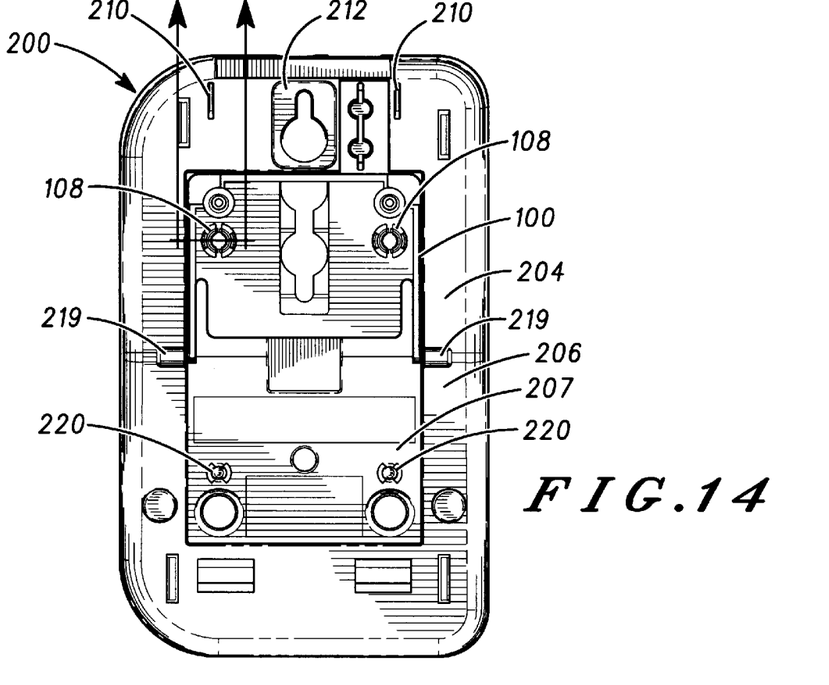
FIG. 14 is a plan view of the base and bracket in the first position.
Figure 15:
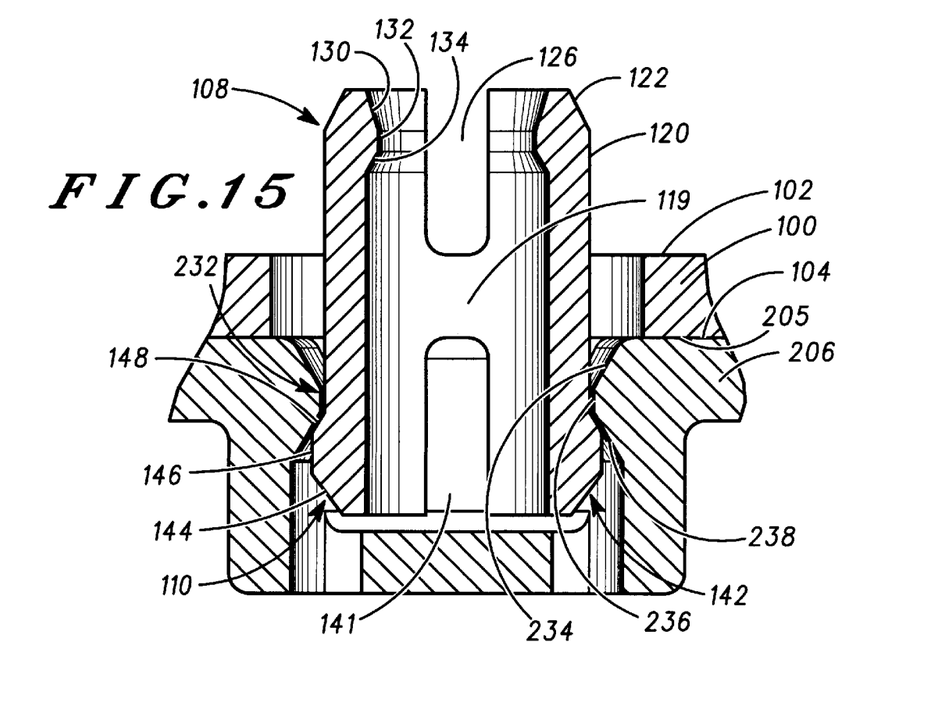
FIG. 15 is a cross-sectional view of FIG. 14 taken at lines 15—15.

Turning now to FIGS. 11–13, the operation of the bracket can be seen. In particular, in the first locked position or table mount position as shown in FIG. 11, the top portion 110 (not visible) is operatively coupled to locking aperture 218 (not visible). Top portion 110 and locking apertures 218 can be seen in FIG. 13, while the coupling of these elements is shown in FIGS. 14 and 15. Bracket 100 can be released from the first locked position as shown in FIG. 12 by applying upward pressure to the end of the bracket. When released, the bracket can be pivoted by means of pivot pins 112 and pivot pin receptacles 219. The bracket can then be secured in the second locked position as shown in FIG. 13 for being mounted on a wall. As can be seen in FIG. 13, the first wall mounting member 114 and the second wall mounting member 212 are coplanar. In this position, the bottom portion 108 (not visible) of coupling member 106 is operatively coupled to locking pins 220 (not visible). Bottom portion 108 and locking pins 220 are shown in FIG. 11, while the coupling of these elements is more clearly shown in FIGS. 16 and 17.

Turning now to FIGS. 14 and 15, the mating of top portion 110 and locking aperture 218 is shown. In particular, FIG. 15, which is a cross-sectional view of the plan view of base 200 and bracket 100 in the first locked position taken at lines 15—15 of FIG. 14, shows the locked state of top portion 110 and locking aperture 218. The locked state is reached by applying pressure to bracket 100. As first beveled edge 144 of flange 142 contacts first beveled edge 234 of locking flange 232, the half portions of top portion 110 are guided toward one another. As top portion 110 continues to move downward, contact surface 146 is adjacent to contact surface 236. Finally, in the locked position, half portions of top portion 110 are returned to their normal position and the second beveled edge 148 of top portion 110 is positioned adjacent to second beveled edge 238 of locking flange 232. Top portion 110 of coupling member 106 can be removed from locking aperture 218 by the opposite process when upward pressure is applied to bracket 100.

Figure 16:
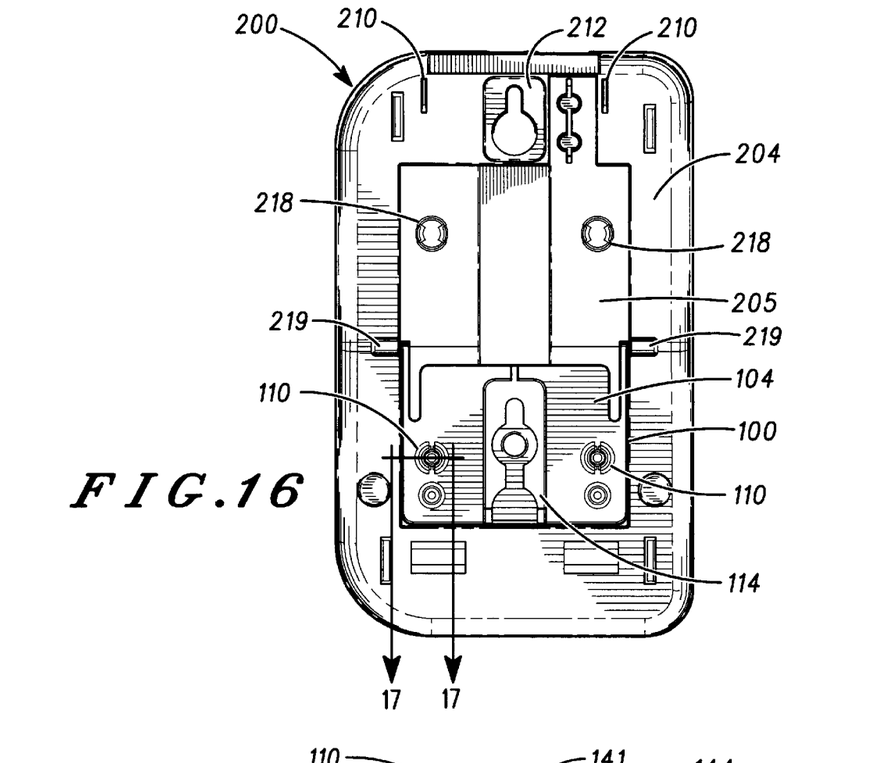
FIG. 16 is a plan view of the base and bracket in the second locked position.
Figure 17:
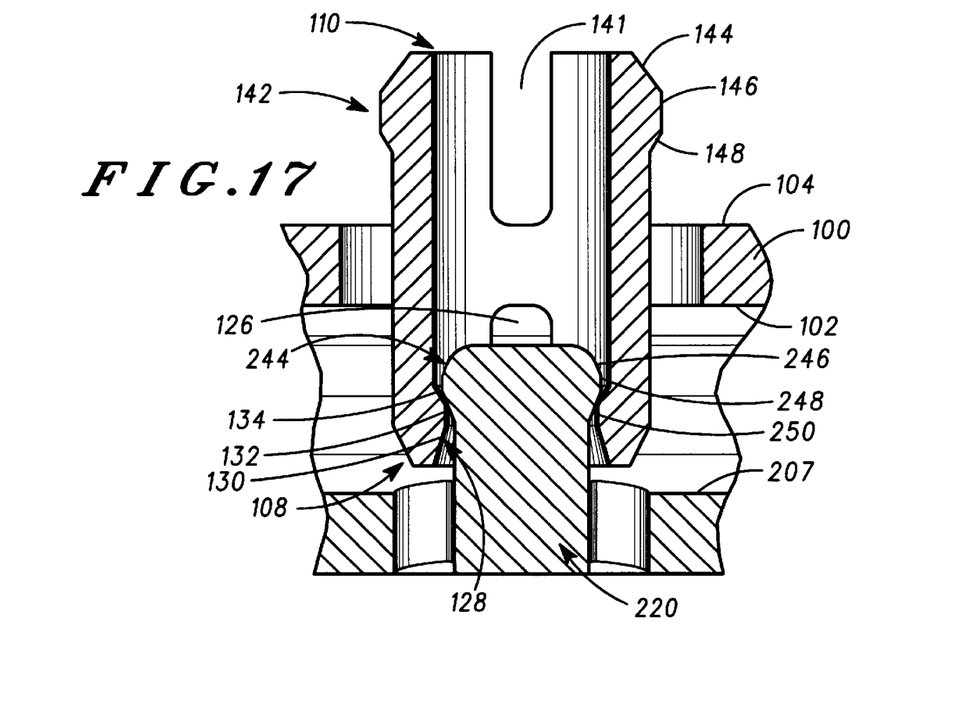
FIG. 17 is a cross-sectional view of FIG. 16 taken at lines 17—17.

Turning now to FIGS. 16 and 17, the coupling of bottom portion 108 of coupling member 106 and a locking pin 220 is shown. In particular, FIG. 17, which is a cross-sectional view of the plan view of base 200 and bracket 100 in the second locked position taken at lines 17—17 of FIG. 16, shows the locked state of bottom portion 108 and locking pin 220. As the bracket is rotated and the bottom portion is placed in contact with locking pin 220, first beveled edge 130 of flange 128 is in contact with first beveled edge 246 of locking pin 220. As bottom portion 108 is advanced further downward, contact surface 132 of bottom portion 108 is adjacent to contact surface 248 of locking pin 220. In this position, the half portions of bottom portion 108 are guided slightly outward. Finally as bottom portion 108 is moved to the locking position, second beveled edge 134 is adjacent to second beveled edge 250, locking the bracket in place. The bracket can be released by upward pressure, causing the reverse operation of bottom portion 108 of the coupling member.

In summary, the coupling apparatus of the present invention provides a unique design which minimizes tool design and tool maintenance. The coupling apparatus of the present invention preferably comprises a hollow cylinder having gaps extending in the axial direction from the ends, leaving attachment members in the center. One end of the cylinder contains an undercut feature in the shape of an annular ring or flange on the exterior surface of the cylinder. The opposite end of the cylinder contains an undercut feature in the shape of an annular ring or flange on the interior surface of the cylinder. The gaps in the center of the cylinder allow the half portions of the cylinder to flex about the attachment members toward or away from one another at each end respectively. The novel coupling apparatus finds particular application in retaining a pivoting wall mount/desk mount conversion bracket in either of two positions.

Although the invention has been described and illustrated in the above description and drawings, it is understood that this description is by way of example only and that numerous changes and modifications can be made by those skilled in the art without departing from the true spirit and scope of the invention. While specific shapes of the top and bottom portions of the attachment members and the locking apertures and on locking pins are shown and described, these elements could have other shapes. For example, flanges having rounded surfaces rather than beveled edges, could be employed according to the present invention. Also, the gaps in the coupling apparatus could be eliminated by selecting a pliable material such as a soft rubber to allow the flanges on either end of the coupling apparatus to move with respect to on another to enable the coupling feature of the present invention. Although the present invention finds particular application telephone base stations, the invention could be applied to any communication device, including pagers, electronic organizers, or computers. Applicants' invention should be limited only by the following claims.

We claim:

1. A coupling apparatus comprising:
   a substantially hollow cylinder;
   a bracket comprising pivot pins adapted to rotatably couple said bracket to a base;
   attachment members near the center of said substantially hollow cylinder on an exterior surface wherein said substantially hollow cylinder is operatively coupled to said bracket by said pair of attachment members;
   at least one first flange on said exterior surface of said substantially hollow cylinder on a first side of said attachment members, said at least one first flange on an exterior surface being adapted to flex about said attachment members; and
   at least one first flange on an interior surface of said substantially hollow cylinder on a second side of said attachment members, said at least one first flange on an interior surface being adapted to flex about said attachment members.

2. The coupling apparatus of claim 1 wherein said substantially hollow cylinder comprises gaps extending in an axial direction from said first end and said second end.

3. The coupling apparatus of claim 2 wherein said gaps form half portions at each end of said substantially hollow cylinder, wherein said half portions at said first end and said second end of said substantially hollow cylinder are able to move with respect to one another.

4. The coupling apparatus of claim 3 wherein said at least one first flange on said exterior surface comprises a flange on each half portion at said first end of said substantially hollow cylinder and said at least one second flange on said interior surface comprises a flange on each half portion at said second end of said substantially hollow cylinder.

5. The coupling apparatus of claim 4 wherin each said flange comprises a first beveled edge, a flat surface and a second beveled edge.

6. The coupling apparatus of claim 1 wherein said attachment members comprise torsion bars.

7. A bracket assembly in combination with a housing, the bracket assembly movably coupled to said housing when moved to one of two positions, said combination comprising:
   a substantially hollow cylinder having gaps extending in an axial direction from a first end and a second end of said substantially hollow cylinder toward said bracket assembly;
   a pair of attachment members coupling said substantially hollow cylinder to said bracket assembly;
   a first flange on an exterior surface of said substantially hollow cylinder at said first end;
   a second flange on an interior surface of said substantially hollow cylinder at said second end opposite said first end;
   a first coupling device associated with said housing for receiving said first flange on said exterior surface of said substantially hollow cylinder at said first end; and
   a second coupling device associated with said housing for receiving said second flange on said interior surface of said substantially hollow cylinder at said first end.

8. The combination of claim 7 wherein said gaps form half portions at each end of said substantially hollow cylinder, wherein said half portions at each end of said substantially hollow cylinder are able to move with respect to one another.

9. The combination of claim 7 wherein said first coupling device associated with said housing comprises a locking aperture having at least one flange, said locking aperture receiving said flange on said exterior surface of said substantially hollow cylinder at said first end when said bracket assembly is in a first position.

10. The combination of claim 7 wherein said second coupling device associated with said housing comprises a locking pin having at least one flange, said locking pin coupling to said flange on said interior surface of said substantially hollow cylinder at said first end when said bracket assembly is in a second position.

11. A bracket assembly in combination with a housing, the bracket assembly movably coupled to said housing when moved to one of two positions, said combination comprising:
   a hollow cylinder having gaps extending in an axial direction from a first end and a second end of said hollow cylinder toward said bracket assembly;

a pair of attachment members coupling said hollow cylinder to said bracket assembly;

a first flange on an exterior surface of said hollow cylinder at said first end;

a second flange on an interior surface of said hollow cylinder at said second end opposite said first end;

a first coupling device associated with said housing, said first coupling device comprising a locking aperture having at least one flange, said locking aperture receiving said first flange on said exterior surface of said hollow cylinder at said first end when said bracket assembly is in a first position; and a second coupling device associated with said housing, said second coupling device comprising a locking pin having at least one flange, said locking pin receiving said second flange on said interior surface of said hollow cylinder at said first end when said bracket assembly is in a second position.

* * * * *